United States Patent [19]

Etchells et al.

[11] 3,932,674

[45] Jan. 13, 1976

[54] CONTROLLED BULK VEGETABLE FERMENTATION

[75] Inventors: John L. Etchells; Thomas A. Bell; Henry P. Fleming; Roger L. Thompson, all of Raleigh, N.C.

[73] Assignee: The United States of America, Washington, D.C.

[22] Filed: Nov. 29, 1974

[21] Appl. No.: 528,454

[52] U.S. Cl. .............................................. 426/52
[51] Int. Cl.² ........................................ A23L 1/218
[58] Field of Search ............................. 426/49, 52

[56] References Cited
UNITED STATES PATENTS
3,043,032   9/1968   Etchells et al. .................. 426/52

FOREIGN PATENTS OR APPLICATIONS
4,514,867   10/1965   Japan .................................. 426/52

OTHER PUBLICATIONS
Binsted et al., Pickle & Sauce Making, 1962, p. 211.
Etchells et al, Applied Microbiology, Vol. 12, No. 6, (1964) pp. 523–535.

*Primary Examiner*—A. Louis Monacell
*Assistant Examiner*—Esther L. Massung
*Attorney, Agent, or Firm*—Irons & Sears

[57] ABSTRACT

Bulk fermentation of brined vegetables comprising controlled sanitizing, acidifying, buffering, and inoculating while continually purging $CO_2$ from the fermenting vegetable/brine mass.

10 Claims, No Drawings

CONTROLLED BULK VEGETABLE FERMENTATION

A non-exclusive, irrevocable, royalty-free license in the invention herein described, throughout the world for all purposes of the United States Government, with the power to grant sublicenses for such purposes, is hereby granted to the Government of the United States of America.

BACKGROUND

For many, many years research scientists have struggled with the time-honored methods of naturally fermenting vegetables in an ardent endeavor to minimize or eliminate the serious element of chance attending such fermentation. By that is meant that a host of factors come into play which all too often deleteriously affect the quality of the fermented product. Typically, the varied nature and quality of the stock to be fermented, the multiple and likewise varied microorganisms found associated with such stock, the difficulties attending control of, say, salt and acid concentrations during a 6–12 month fermentation period, etc., all come into play and any of them can adversely affect the quality of the fermented product, as reflected by odor, taste, bloating, and the like.

On the whole, the efforts made over the years have been very rewarding in that significantly improved controls have been instituted, waste has been reduced and the risk factor reduced. Nevertheless, the art of naturally fermenting vegetables, such as cucumbers, is still plagued by the element of chance; it is still very dependent upon the human factor, i.e., the skill of the artisan; and it is still crippled by inordinate losses and waste.

The following references clearly attest to the great strides that have been made and provide an excellent insight into the pitfalls attending the art of fermenting vegetables:

U.S. Pat. No. 3,374,099, Mar. 19, 1968, for Enzyme Inhibitor for Preventing Softening in Brined Foods, Bell, T.A., Etchells, J. L., and Smart, W. W. G., Jr.

U.S. Pat. No. 3,403,032, Sept. 24, 1968, for Pure Culture Fermentation Process for Pickled Cucumbers, Etchells, J. L., Bell, T. A., and Costilow, R. N.

U.S. Pat. No. 3,410,755, Nov. 12, 1968, for Process and Media for Producing Cells of Lactic Acid Bacteria, Etchells, J. L., and Costilow, R. N.

U.S. Pat. No. 3,480,448, Nov. 25, 1969, for Pure Culture Fermentation of Green Olives, Etchells, J. L., Bell, T. A., and Kittel, I. D.

J. L. Etchells, A. F. Borg, I. D. Kittel, T. A. Bell, and H. P. Fleming, Pure Culture Fermentation of Green Olives, Applied Microbiology, Vol. 14, No. 6, (1966) pp. 1027 – 1041.

J. L. Etchells, R. N. Costilow, T. E. Anderson, and T. A. Bell, Pure Culture Fermentation of Brined Cucumbers, Applied Microbiology, Vol. 12, No. 6, (November 1964) pp. 523 – 535.

J. L. Etchells, A. F. Borg, and T. A. Bell, Bloater Formation by Gas-forming Lactic Acid Bacteria in Cucumber Fermentations, Applied Microbiology, Vol. 16, No. 7, (July 1968) pp. 1029 – 1035.

J. L. Etchells, T. A. Bell, H. P. Fleming, R. E. Kelling, and R. L. Thompson, Suggested Procedure for the Controlled Fermentation of Commercially Brined Pickling Cucumbers-the Use of Starter Cultures and Reduction of Carbon Dioxide Accumulation, Pickle Pak SCIENCE, Vol. III (December 1973), pp. 4 – 14.

H. P. Fleming, F. L. Thompson, J. L. Etchells, R. E. Kelling and T. A. Bell, Bloater Formation in Brined Cucumbers Fermented by *Lactobacillus plantarum*, Journal of Food Science. Vol. 38 (1973), pp. 499 – 503.

H. P. Fleming, R. L. Thompson, J. L. Etchells, R. E. Kelling and T. A. Bell, Carbon Dioxide Production in the Fermentation of Brined Cucumbers, Journal of Food Science, Vol. 38 (1973) pp. 504 – 506.

Henry P. Fleming, Roger L. Thompson and John L. Etchells, Determination of Carbon Dioxide in Cucumber Brines, Journal of the AOAC, Vol. 57, No. 1, 1974, pp. 130 – 133.

F. W. Fabian and R. C. Fulde, The Rate of Salt Penetration Into Pickles Charted, Size By Size, Food Packer, Vol. 31, No. 9, pp. 23, 38, 41; and No. 10 (1950), pp. 28–29, 38–40, 51.

Still left to chance, however, are any number of hidden factors which, over the conventional extended period of fermentation of 6 to 12 months, account for heretofore high rates of product losses and, as a result, serious economic handicaps.

Typically, the present uncontrolled commercial brine-stock pickling procedures admit of any or all of the following drawbacks in any given tank of fermented pickles: soft or inferior textured pickles; bloaters (hollow stock) or gassy deterioration; shriveled or flat stock; poor color (external and internal bleaching); unclean odor and taste; and poor keeping quality (storability, shelf-life).

The present invention, on the other hand, provides the following very important advantages: new pickled vegetable products with improved flavor, odor, color, texture, savor, stability, and general appearance; a more scientifically controlled vegetable fermentation industry; reduction of losses due to bloaters, softening, shriveling, and poor color; reduced processing time and costs with opportunities for increased automation; reduced waste disposal problems; diversification and readycash for small farmers; increased opportunities for food processing in rural areas; simple and inexpensive means for preserving vegetables in developing countries; reduced waste disposal problems reducing the quantity of salt needed; use of significantly lower salt concentrations during fermentation and bulk storage; and other like advantages which will be apparent from the description, infra.

INVENTION

The present invention relates to controlled lactic acid fermentation of vegetables, in bulk. More particularly, the instant discovery involves careful sanitizing, acidifying and buffering of brined vegetables preliminary to inoculating same with a viable culture, all the while purging autogenously-generated dissolved $CO_2$ from the vegetable/brine mass.

According to the present invention, a revolutionary method has been found for controlled lactic acid fermentation of cucumbers and other vegetables brined in bulk. Whereas heretofore at least 60 days, usually 6–12 months, was involved in the conventional or natural fermentation of vegetables, the instant discovery accomplishes the job in 7–12 days.

In addition, as indicated hereinbefore, the defects of brinestock pickles are very significantly minimized or eliminated pursuant to the present invention. Typically and more specifically, not only have bloaters — which heretofore constituted about one-third of conventionally-fermented large size cucumbers — been essentially eliminated, but the texture, color, appearance, odor, and taste of the pickles produced by the fermentation process of the present invention are all immeasurably enhanced.

Briefly, it has been found that cucumbers, for example, may be rapidly fermented into brine-stock pickles by, stepwise, thoroughly washing the cucumber green stock, sanitizing by incorporating active chlorine into a brine for the stock and acidifying same with acetic acid or vinegar, uniformly buffering, and inoculating with acid-tolerant cultures, e.g., special strains of *Lactobacillus plantarum*, *Pediococcus cerevisiae*, or a combination of both, all the while sweeping fermentation gases, particularly $CO_2$, from the fermenting medium using an inert gas, such as nitrogen.

While the prior art alluded to above has shown that rapid pure culture fermentation, employing the so-called heat-shock (170°F., 5 minutes) method, could be successfully accomplished on small quantities of vegetables, i.e., one- to five-quart quantities, the heat-shock process is entirely impractical for bulk brining in commercial tanks. Further, controlled culture fermentation, in bulk, of large size cucumbers, sans heat-shock treatment, creates severe bloating problems, even with careful sanitizing, acidification and buffering. The heat-shock treatment used in small quantity pure culture fermentation destroys contaminating microbes found on green stock, which microbes adversely affect the quality of the fermented product.

Needless to say, present conventional brine-stock bulk pickling procedures (natural fermentation methods) do not employ the just-mentioned heat-shock method and the hereinabove-described serious disadvantages persist. Likewise, the present invention is not directed to heat-shock treatment but rather to controlled fermentation, in bulk, using acid-tolerant cultures.

To achieve the results herein alluded to, it is important to grade out stock that is diseased, broken or moldy; to carefully wash the remaining selected stock; to control the vegetable/brine volume ratio; to properly chlorinate the vegetable/brine mixture; to carefully acidify; to uniformly buffer the vegetable/brine mass; having achieved the desired controlled conditions, to add a viable culture of lactic acid bacteria; and, all the while, to continually control the vegetable/brine strength and purge $CO_2$ from the fermenting vegetable/brine material. Fermentation is completed when the sugar content of the vegetable/brine mass is near zero.

As will also be seen hereinafter, the controlled bulk fermentation process of the instant discovery is far simpler than the age-old conventional uncontrolled natural fermentation process. Of course, the revolutionary rapidity, the economy and the superior reproducible results achieved are unprecedented.

After grading out stock that is diseased, broken or moldy, and according to a preferred embodiment, the graded stock is washed thoroughly with a brush- or reel-type washer. Preferably, also, stock which has been refrigerated is tempered to 65° – 70°F. with a warm water pre-soak before or during the washing step.

Conventional techniques may be used to achieve the desired packout ratio (i.e., the vegetable/brine ratio, by volume) in likewise conventional bulk fermentation tanks. As the knowledgeable artisan knows, for instance, the pack-out ratio takes into consideration in-tank shrinking of the vegetable and the volume of cover brine.

The pack-out ratio herein contemplated is in range of 40 to 75 percent vegetable to 60 to 25 percent brine, preferably 55 – 70 to 45 – 30 percent.

Generally, from about 15° to about 32° salometer brine, preferably from about 20° to about 28° salometer brine, is used to initiate fermentation and sufficient salt added throughout fermentation to maintain the salt concentration in that range. As a point of reference, 25° salometer is about 6.6% NaCl concentration, weight by volume.

The active chlorine concentration in the brine, upon sanitizing, is usually in the range of about 50 to about 100 parts active chlorine ($Cl_2$) per million parts brine, preferably from about 70 to about 90 ppm. The active chlorine may be added as liquid chlorine, sodium hypochlorite, or the like. In practice, the initial brine generally contains the active chlorine and additional active chlorine is introduced about 12 to 14 hours after the initial chlorination, i.e., generally about 10 to 12 hours before inoculation.

In other words, the initial chlorination, in the concentration given, destroys substantially all the microbial flora in the brine, thus guarding against uncontrolled growth of interfering, vegetative microorganisms.

Similarly, for the purpose of controlling acid-sensitive microorganisms and to inhibit the germination of microbial spores, the vegetable/brine mass is acidified with sufficient weak organic acid to reduce the pH of the brine to between about 2.7 to about 3.2. According to a preferred embodiment, the acid is added after about 45 to about 180 minutes of sanitizing with the chlorinated brine, preferably from about 60 to about 120 minutes. Again, as in the case of the chlorination treatment, competitive contaminants are being controlled to substantially eliminate or minimize interference with the culture of choice, i.e., the lactic acid bacteria herein contemplated.

The weak organic acid of choice is glacial acetic acid or its equivalent amount of 100–200 grain vinegar. In practice, when fermenting cucumbers, for example, the just-mentioned pH desideratum is generally achieved by adding acetic acid at the rate of about 6.0 milliliters (ml) per gallon of total cucumbers and brine.

Following acid addition to achieve the desired pH, the vegetable/brine mass is allowed to ferment and salt is added incrementally to maintain the aforementioned initial brine strength (15°–32° salometer) until the point of near equilibration. The brine, at equilibration, usually contains from about 0.2 to about 0.6 percent sugar, by volume, preferably about 0.4 to about 0.6 percent. In practice, the desired brine strength is generally achieved by salt addition at the rate of 6 pounds of salt for every hundred pounds of cucumbers.

By near equilibration is intended the condition in the vegetable/brine mass in which the moisture content of the vegetable has substantially all diffused and the salt concentrations of the brine outside and inside the vegetable are about the same or the same.

The chlorine sanitizing step hereinabove disclosed is repeated at least once — depending upon the rapidity of equilibration — about midway intermediate the original chlorination and equilibration. In this way, and at the concentrations heretofore recited, microbial flora appearing subsequent to the initial chlorine sanitizing are substantially destroyed and the control sought in order to preferentially open up the vegetation sites to the microorganisms of choice, i.e., lactic acid bacteria, is achieved. In short, the latter are given a real competitive edge and the fermented products reflect the advantages inherent in avoiding mixed flora (natural).

Having achieved the state of equilibration or near equilibration, sufficient of a buffer is introduced, uniformly throughout the brine, to realize a brine pH between about 4.2 and about 4.8, preferably between about 4.5 to about 4.7, likewise uniformly throughout the brine. Typical suitable buffers are sodium acetate, potassium acetate, calcium acetate, and phosphate.

The viable culture of lactic acid bacteria introduced into the brine following uniform buffering is preferably selected from *Lactobacillus plantarum*, *Pediococcus cerevisiae*, and mixtures thereof. Very vigorous strains of these bacteria have been found to exhibit very good growth rate at rather high salt concentrations. The cultures herein contemplated must have a high level of viability, proper count and, particularly, the ability to regenerate rapidly in the equilibrated brine strength to which they are added.

Of course, other species of lactic acid bacteria which possess these attributes under the brining conditions herein disclosed are likewise within the purview of the present invention. It is important to stress, at this point, that the brine should be essentially free of active chlorine before inoculating, since any available $Cl_2$ will inhibit the inoculum.

The starter culture, under the preferred conditions of the present invention, is added about 18 to 26 hours after the initial brining, but, as indicated above, about 2 to 3 hours after the buffer is introduced. The concentration of lactic acid bacteria generally employed is in the range of about 1 to about 10 billion, preferably about 2.5 to about 6 billion, viable cells per gallon of brined material (vegetable/brine).

In monitoring the salt concentration of the brine, it is important to observe the point of near equilibration of the initial salt brine with the moisture content of the vegetable brined, since the culture is best added when such equilibration has reached the desired brine strength zone. Equilibration rates depend, for the most part, upon the size and age of the green stock. Freshly harvested cucumbers are generally graded to size (diameters) as follows: no. 1 refers to cucumbers having diameters up to 1 1/16 inches; no. 2 equals 1 1/16 to 1 ½ inches; no. 3 equals 1 ½ to 2 inches; and no. 4 equals over 2 inches. It has been determined that the approximate percentages of salt absorbed in 24 hours by nos. 1, 2, and 3 size cucumbers is 95, 85 and 50%, respectively.

The temperature at which the controlled bulk fermentation process of the present invention is best carried out is generally in the range of about 65° to about 90°F., preferably about 78° to about 85°F.

The carbon dioxide ($CO_2$) found in the fermentation tank develops from several sources, viz., from natural cucumber respiration into the brine as well as from so-called "non-gas-forming" species of the lactic acid bacteria herein contemplated. The Fleming et al. reference alluded to hereinabove, entitled "Bloater Formation in Brined Cucumbers Fermented by *Lactobacillus plantarum*" Journal of Food Science, Vol. 38 (1973), pp. 499–503, teaches a procedure for determining $CO_2$ in fermenting brines.

Since many variables determine the amount of $CO_2$ generated, the pickle processor is urged to determine the extent of $CO_2$ formation in his type of operation and to purge accordingly in order to achieve optimum bloater control. Among the variables are the type of green stock (including its size), cucumber-to-brine ratio, tank configuration, brine strength, brine temperature, chemical composition of the brine, and the like.

Having determined the extent of purging needed in his operation, the processor can implement same by intermittent or continuous purging using an inert gas, preferably nitrogen. Exemplary modes of purging will be advanced infra. Generally, however, the inert gas is bubbled up and past the brined cucumbers at the desired rate and carries with it the $CO_2$ (in sweeping action) upwardly past the brined cucumbers to the brine surface and into the atmosphere. Additional ventilation in the conventional tank, in the top section thereof, is desirable and can be provided, for example, by drilling spaced holes in superimposed headboards which abut the uppermost layer of, say, cucumbers and prevent their upward movement.

For best results when fermenting small-sized cucumbers according to the present invention (for example, no. 1 and no. 2 cucumbers having a diameter of 1 ¼ inches or less), the original 15° to 30° salometer cover brine is drained off after about 36 to 48 hours following the initial brining. A new brine of the same strength, properly acidified as taught herein, is then introduced into the tank, the new brine likewise having from about 50 to about 100 parts per million of active chlorine. The process hereinabove described is then resumed. Of course, purging with an inert gas and maintaining the requisite brine strength are likewise required.

The object of the draining step is to remove naturally-occurring softening enzymes (chiefly from the mold-laden retained blossoms) which would otherwise diffuse into the cover brine and thence into the brined material, deteriorating the texture of the latter.

Further with respect to the purging step and factors which influence rate of build-up in $CO_2$ concentration, it has been found that 20–25 cubic feet/hour of nitrogen, on a continuous purging basis, is very effective when fermentation is carried out in a 6000-gallon tank, about 12 feet in diameter and 7 ½ feet deep. Intermittent purging at substantially higher gas flow rates has likewise been successful.

Factors which influence the rate of $CO_2$ build-up include temperature of the brined cucumber mass, brine strength, percentages of cucumbers and brine, the condition of the material brined, and the like.

Other vegetables within the purview of the process of the present invention are cauliflower, onions, olives, and the like. In the case of olives (green), for instance, a conventional pre-treatment to remove most of the bitterness is employed prior to fermenting as taught herein. The pre-treatment consists of first soaking the olives in a weak lye solution, about 1.25 to 2.0 percent, until the lye has penetrated ⅔–¾ of the way to the pit; this is followed by quickly pouring off the lye solution, rinsing the olive twice with cool water (40°F.) and then leaching the fruit in two changes of cool water (40°F.) during a fourteen-hour period to remove the alkali.

As to the cauliflower vegetable, the procedure given herein, with respect to the small-size cucumbers (viz., draining), is followed.

Onions are treated the same as cauliflower, with the exception that they require peeling to remove the outer skin layer prior to the draining.

The terms "buffer" and "buffering" herein are not limited to added agents of the type hereinbefore described. Included also are these very agents prepared in situ in the brine medium by the reaction of added alkaline earth metal hydroxides and alkali metal hydroxides (including but not limited to sodium hydroxide, potassium hydroxide, calcium hydroxide, and the like) with the acetic acid found in the brine medium.

While less of the hydroxide reactant is needed generally, to achieve the desired pH, upon buffering, the effect of controlling acidity preliminary to culture addition is efficiently achieved. Of course, it is necessary to await adequate and uniform commingling of the added buffer precursor before anticipating the target pH. Experience readily provides the needed timing.

Referring to the purging of $CO_2$, it should be pointed out that inert gases other than nitrogen are herein contemplated, such as inert air, rare inert gases, and the like.

While the flow rates of purge gas are to be tailored to individual operational needs, it is preferred (but by no means imperative) that the rate be adjusted to limit the $CO_2$ in the brine, during fermentation, to a concentration below about 20 mg/100 ml fermenting brine. Again, purging may be intermittent or continuous.

Of course, the pH, salometer, sugar, and other readings involved in the process may be carried out by known analytical means. By the same token, dissemination of components into the brine to readily achieve uniform conditions can be carried out in a number of ways using a variety of means or devices. The examples, infra, are merely illustrative in this regard.

EXAMPLES

The following examples are intended to be illustrative only and not to unduly limit the scope of the appended claims:

EXAMPLE I

Into a clean 6000-gallon cucumber fermentation tank is introduced a 25° salometer brine containing 80 ppm available chlorine, sufficient of the brine being introduced to fill to a depth of about 12 inches from the bottom of the tank. The tank is then filled heaping full with 600 bushels of freshly harvested cucumbers, grade no. 3, the 12-inch brine content forming a cushion for the descending cucumbers. Before being fed to the tanks this green stock has first been examined for quality in order to grade out cucumbers that are broken, moldy or diseased, and the selected stock is then washed thoroughly with a brush-type washer.

The stock fed to the tank settles in the cushion brine until the upper surface of the cucumber mass is about 1 foot below the top of the tank. This is known as in-tank shrinking. A record is kept in hundredweight units (cwt) of the cucumbers fed to the tank; at 50 lbs./bu., 600 bu. equals 30,000 lbs. or 300 cwt.

Subsequently, a "false" head made of wooden boards is placed against the top surface of the cucumbers, which head comprises, more specifically, headboards about 1 inch thick and 10 inches wide keyed down securely with 4 × 4 inch lumber of appropriate length, i.e., the 2 × 4's prevent vertical upward movement of the headboards which, in turn, keep the cucumbers from rising. These headboards have a number of ⅜ inch holes in them spaced to provide about 10 holes per square foot of cover brine surface.

More chlorinated 25° salometer brine containing 80 ppm of active chlorine is introduced into the tank until the liquid level is 6 inches above the headboards and about 4 inches below the top of the tank.

After about 2 hours, about 8.8 gals. of glacial acetic acid is added by the use of a siphon arrangement directed into a 4-inch diameter plastic tube mounted vertically from top to bottom in the approximate center of the tank. The tube is held securely in position at the bottom of the tank and at the top by a hole in the headboards of appropriate size through which it extends to a distance of about 3 inches above the brine level. The entire length of the tube is perforated with ⅜-inch diameter holes; in addition, the tube is saw-tooth-notched (about 3-inch notches) at the bottom.

It has been found that the tube can also be conveniently used to sample the brine for carbon dioxide tests, in order to determine the effectiveness of the purging schedule. Further, it provides the means for adding the starter culture at the appropriate time.

The acetic acid is added at the rate of 6 milliliters per gallon of total cucumbers and brine. The pH of the resulting acidified brine is 2.8 (ca.).

Salt is added at the rate of 6 pounds of salt for every 100 pounds of cucumbers in the tank, in order to maintain the brine strength at the above-mentioned 25° salometer. Two-thirds of the salt is added at the outset, i.e., at the time of brining, and the balance added 24 hours later.

The brine temperature during fermentation is maintained at about 80°F.

After the acidification step using glacial acetic acid, the brine is held in that condition until the sugar (glucose/fructose) content of the brine is about 0.2 percent, indicating that sugar has been released by the cucumbers.

Having reached that sugar concentration, the brine is buffered with 229.3 lbs. of sodium acetate to a pH of about 4.8. This is accomplished by adding, about 2½ hours before the culture addition, as well as before a second salt addition, sodium acetate at the rate of 0.5% sodium acetate per gallon of packed and brined material, with brine calculated as water.

At or very near the time when an equilibrated salt concentration is achieved (i.e., about 24 hours after the brining and just before the aforementioned second addition of salt, as well as about 2½ hours after acetate addition), the starter culture, viz., *L. plantarum* having a high level of viability and the ability to regenerate rapidly in the equilibrated brine strength, is added at the rate of 4 billion viable cells per gallon of brine material (cucumbers and brine). At this point in time in the process, also, the brine is essentially chlorine-free.

Purging of the above mass (cucumbers/brine material) is accomplished by means of a spiral-shaped, tubular sparger arrangement having multiple 1/64 inch dia. holes therein, which sparger is placed at the bottom of the tank and connected, outwardly of the tank, to a nitrogen source. Nitrogen coursing through the tubular sparger exists through the holes and ascends through the brine, sweeping $CO_2$ with it in its travel to the atmosphere above the brine surface. The nitrogen gas flow rate used is 23 cubic feet/hour, continuously throughout fermentation.

Further statistics on the cucumber-brine-mass fed to the tank are:

volume occupied by cucumbers only is 3600 gals.
volume occupied by brine only is 1934 gals.
total volume occupied by cucumbers and brine 5534 gals.
volume ratio of cucumbers/brine is 65%/35%

EXAMPLES II–XII

Example I is repeated in every essential respect as to each of the examples in the following Table I, save for the changes which are indicated.

TABLE I (1) (2)

|          | Pickling cucumbers | | Volume occupied by | | Total volume of cucumbers plus brine | Brine additives | |
|----------|-------|--------|----------|----------|----------|-----------|-----------|
|          |       |        |          |          |          | Acetic acid added | Sodium acetate added |
| Ex. No.  | bushels, no. | Weight, pounds | cucumbers only- gallons | brine only- gallons | gallons | gallons | pounds |
| II       | 100   | 5000   | 600      | 322      | 922      | 1.45      | 38.1   |
| III      | 200   | 10000  | 1200     | 645      | 1845     | 2.93      | 76.5   |
| IV       | 300   | 15000  | 1800     | 967      | 2767     | 4.25      | 114.6  |
| V        | 400   | 20000  | 2400     | 1289     | 3689     | 5.84      | 153.0  |
| VI       | 500   | 25000  | 3000     | 1612     | 4612     | 7.32      | 191.1  |
| VII      | 700   | 35000  | 4200     | 2256     | 6456     | 10.22     | 267.0  |
| VIII     | 800   | 40000  | 4800     | 2579     | 7379     | 11.70     | 305.8  |
| IX       | 900   | 45000  | 5400     | 2901     | 8301     | 13.17     | 344.1  |
| X        | 1000  | 50000  | 6000     | 3223     | 9223     | 14.61     | 382.3  |
| XI       | 1100  | 55000  | 6600     | 3546     | 10146    | 16.10     | 420.4  |
| XII      | 1200  | 60000  | 7200     | 3868     | 11068    | 17.54     | 458.8  |

(1) About 65% cucumbers and 35% brine.
(2) Temperature is 82°F.

|      | Salometer | Active chlorine | Temp. °F. | pH, acid addition | Sugar release % | Buffer, pH | Lactic acid bacteria, cells/gal. |
|------|-----------|-----------------|-----------|-------------------|-----------------|------------|----------------------------------|
| II   | 18        | 90              | 75        | 3.1               | 0.4             | 4.6        | (3)                              |
| III  | 16        | 75              | 68        | 2.8               | 0.3             | 4.4        | (4)                              |
| IV   | 30        | 70              | 87        | 3.0               | 0.5             | 4.4        | (3)                              |
| V    | 17        | 80              | 78        | 3.2               | 0.2             | 4.8        | (5)                              |
| VI   | 17        | 85              | 77        | 2.7               | 0.4             | 4.6        | (4)                              |
| VII  | 18        | 82              | 67        | 2.9               | 0.3             | 4.4        | (4)                              |
| VIII | 19        | 87              | 85        | 3.0               | 0.4             | 4.3        | (4)                              |
| IX   | 29        | 75              | 82        | 2.8               | 0.3             | 4.7        | (5)                              |
| X    | 25        | 78              | 82        | 2.7               | 0.5             | 4.2        | (3)                              |
| XI   | 24        | 74              | 80        | 2.9               | 0.5             | 4.5        | (3)                              |
| XII  | 25        | 82              | 78        | 3.1               | 0.4             | 4.5        | (3)                              |

(3) *L. plantarum*
(2) *P. cerevisiae*
(5) Mixture of (3)+(4), 50/50.

What is claimed is:

1. A rapid, controlled bulk fermentation process for vegetables, under conventional pack-out conditions, which comprises washing said vegetables and then immersing them in a 15°–32° salometer brine; further sanitizing the resulting vegetable/brine mass by chlorinating and acidifying the brine to the extent necessary to provide, respectively, from about 50 to about 100 parts per million of active chlorine in the brine and a pH thereof between about 2.7 and about 3.2, said chlorine destroying substantially all the microflora in the brine; maintaining initial brine strengths by counteracting dilution of the brine resulting from diffusion of vegetable moisture by incrementally adding salt to the brine until the point of near equilibration, the brine at that point containing between about 0.2 and about 0.6% sugar, by volume; repeating the chlorine sanitizing step at least once about midway between the original chlorination and equilibration to again destroy microflora build-up in the brine; uniformly buffering the nutrient-containing brine to a pH between about 4.2 and 4.8; then adding to said brine a viable culture of one or more species of lactic acid bacteria either singly or in conjunction; sweeping with an inert gas autogenously-produced $CO_2$ from the brine during the above steps, this purging being carried out until fermentation is essentially complete, i.e., when the sugar content of the vegetable/brine mass is near zero and there is essentially no further development of brine acid; and the above process being carried out at a temperature in the range of about 65°F. to about 90°F.

2. The process of claim 1 wherein cucumbers are the vegetables.

3. The process of claim 2 wherein the acidifying agent is acetic acid.

4. The process of claim 3 wherein the buffer is sodium acetate.

5. The process of claim 4 wherein the lactic acid bacteria species is a combination of *Lactobacillus plantarum* and *Pediococcus cerevisiae*.

6. The process of claim 5 wherein the inert sweeping gas is nitrogen.

7. The process of claim 6 wherein the pack-out ratio is in the range, by volume, of about 40 to about 75 percent vegetable to about 60 to about 25 percent brine.

8. The process of claim 7 wherein the salt concentration is in the range of 20°–28° salometer; the active chlorine concentration is in the range of about 70 to about 90 ppm; the sugar concentration of the brine at or near equilibration is in the range of about 0.4 and about 0.6 percent, by volume; the pH of the brine upon buffering is in the range of about 4.5 to about 4.7; the temperature of the cucumber/brine mass is in the range of 78°–85°F.; the pack-out ratio is in the range of about 55 to about 70 cucumbers to about 45 to about 30 brine; and no. 3 grade size cucumbers are the vegetables.

9. The process of claim 8 wherein sweeping of autogenously-produced $CO_2$ out of the cucumber/brine mass is effected by introducing gaseous nitrogen at the bottom of the fermentation zone containing said mass and allowing it to rise through the zone and sweep the dissolved $CO_2$ along with it and upwardly through the zone and out the top thereof, the quantity and rate of flow of the gaseous nitrogen being sufficient to reduce the $CO_2$ content and pressure below that at which it can deleteriously affect the final brine-stock product.

10. The process of claim 9 wherein small-sized cucumbers having a diameter of 1¼ inches or less are the vegetable, in lieu of grade size no. 3 cucumbers, and the initial cover brine containing chlorine is drained off after about 36 to about 48 hours, the stock re-brined, chlorinated, acidified, and the fermentation process completed.

* * * * *